US012415668B2

(12) United States Patent
Huang

(10) Patent No.: US 12,415,668 B2
(45) Date of Patent: Sep. 16, 2025

(54) WRAPPING MATERIAL AND METHOD OF MAKING THE SAME

(71) Applicant: CHIENFU WRAPPING MATERIALS CO. LTD., Taichung (TW)

(72) Inventor: Hsuan-Fu Huang, Taipei (TW)

(73) Assignee: CHIENFU WRAPPING MATERIALS CO. LTD., Taichung (TW)

( * ) Notice: Subject to any disclaimer, the term of this patent is extended or adjusted under 35 U.S.C. 154(b) by 53 days.

(21) Appl. No.: 17/955,449

(22) Filed: Sep. 28, 2022

(65) Prior Publication Data

US 2023/0095502 A1 Mar. 30, 2023

(30) Foreign Application Priority Data

Sep. 30, 2021 (TW) ................................ 110136461

(51) Int. Cl.

| | |
|---|---|
| ***B65D 81/03*** | (2006.01) |
| ***B31B 70/14*** | (2017.01) |
| ***B31B 70/62*** | (2017.01) |
| ***B31B 70/64*** | (2017.01) |
| ***B65D 33/18*** | (2006.01) |
| ***B65D 33/34*** | (2006.01) |
| *B31B 155/00* | (2017.01) |

(52) U.S. Cl.

CPC .............. *B65D 81/03* (2013.01); *B31B 70/14* (2017.08); *B31B 70/62* (2017.08); *B31B 70/64* (2017.08); *B65D 33/18* (2013.01); *B65D 33/34* (2013.01); *B31B 2155/002* (2017.08)

(58) Field of Classification Search

CPC .... B65D 81/03; B65D 81/052; B65D 27/005; B65D 27/14

USPC ......................... 206/521, 522; 229/80, 87.02

See application file for complete search history.

(56) References Cited

U.S. PATENT DOCUMENTS

| | | | | |
|---|---|---|---|---|
| 2010/0090832 | A1* | 4/2010 | Bozet | B65D 5/4237 340/572.8 |
| 2011/0192121 | A1* | 8/2011 | Kannankeril | B31D 5/0073 53/473 |
| 2015/0314940 | A1* | 11/2015 | Matta | B65D 75/58 206/522 |
| 2020/0406592 | A1* | 12/2020 | Dayrit | B32B 7/12 |
| 2021/0060889 | A1* | 3/2021 | Kannankeril | B65D 81/052 |
| 2021/0284420 | A1* | 9/2021 | Borrero | B65D 81/052 |

* cited by examiner

*Primary Examiner* — Steven A. Reynolds

(74) *Attorney, Agent, or Firm* — Apex Juris, pllc; R. Lynette Wylie

(57) ABSTRACT

A wrapping material includes a substrate and a buffer layer, wherein the substrate has a first lateral edge and a second lateral edge, and the buffer layer has a third lateral edge and a fourth lateral edge. The buffer layer is stacked on the substrate. The first lateral edge of the substrate is tightly merged with the third lateral edge of the buffer layer, and the second lateral edge of the substrate is tightly merged with the fourth lateral edge of the buffer layer. A method of making a wrapping material includes: providing a substrate; stacking a buffer layer on the substrate; using a thermal cutting tool to cut the stacked substrate and buffer layer so that the substrate and the buffer layer are tightly merged at where they are cut as being melted by heat.

11 Claims, 10 Drawing Sheets

WRAPPING MATERIAL AND METHOD OF MAKING THE SAME

BACKGROUND OF THE DISCLOSURE

1. Field of the Disclosure

The present invention relates generally to a wrapping material, and more particularly to a wrapping material with no indentation on the surface and no flattened edges on lateral sides. The present invention also particularly relates to a method of making such a wrapping material.

2. Description of the Prior Art

FIG. 1 shows a tamper evident bag 10 made of a conventional wrapping material. The tamper evident bag 10 has a double-layered structure, wherein the outer layer 12 is made of an opaque plastic material, and the inner layer 14 is made of material with a cushioning function (such as bubble wrap). In addition, an adhesive 162 is provided on the seal flap 16 at the bag opening, and is covered by a release liner 18. By simply removing the release liner 18 and folding the seal flap 16, the bag opening of the tamper evident bag 10 can be enclosed by the effect of the adhesive 162. Once the tamper evident bag 10 is sealed, the object contained inside cannot be taken out without breaking the bag. This is where the name "tamper evident bag" came from.

When an object is placed inside the tamper evident bag 10, and the bag opening is sealed by the seal flap 16, the opaque outer layer 12 ensures that the contained object cannot be seen from outside, and the cushioning inner layer 14 provides basic protection. Since the tamper evident bag 10 cannot be reopened unless broken, the contained object can be further ensured not to be replaced or peeped. Due to these advantages, when sending packages, tamper evident bags are rather common choices for packaging items.

However, the conventional wrapping material used for making tamper evident bags is usually made by combining an opaque plastic material and another cushioning material through thermal pressing. After these two materials are combined due to heat and pressure, they are folded together, and then edges are made on lateral sides through thermal pressing again. The double-layered tamper evident bag 10, composed of the outer layer 12 and the inner layer 14, is made in this way. The outer layer 12 of the tamper evident bag 10 will contract as being melted by heat, and therefore will tightly fit around the inner layer 14. As a result, the texture or the surface pattern of the inner layer 14 will emerge on the surface of the tamper evident bag 10. As can be seen in FIG. 1, the inner layer 14 in this example is made of bubble wrap, which has multiple air bubbles lined in parallel. Therefore, the outer layer 12 also shows corresponding indentations, forming an uneven surface. The overall beauty of the texts or images printed on the surface of the outer layer 12 will be adversely affected. Such a surface is also not suitable for handwriting. In addition, since the edges on the lateral sides of the tamper evident bag 10 are also made through thermal pressing, the lateral sides of the tamper evident bag 10 have flattened banded edges 10A, which inevitably reduces the usable space inside the tamper evident bag 10.

SUMMARY OF THE DISCLOSURE

The present invention provides a wrapping material with no indentation on its surface and no flattened edges on lateral sides. The present invention also provides a method of making such a wrapping material.

Specifically, the present invention provides a wrapping material, which includes a substrate and a buffer layer, wherein the substrate has a first lateral edge and a second lateral edge. The buffer layer is stacked upon the substrate, wherein the buffer layer has a third lateral edge and a fourth lateral edge. The first lateral edge of the substrate and the third lateral edge of the buffer layer are tightly merged into a first tightly merged line, while the second lateral edge of the substrate and the fourth lateral edge of the buffer layer are tightly merged into a second tightly merged line.

In an embodiment, a distance between the first lateral edge and the second lateral edge of the substrate, a distance between the third lateral edge and the fourth lateral edge of the buffer layer, and a distance between the first tightly merged line and the second tightly merged line are all substantially the same.

In an embodiment, the substrate has a first surface facing the buffer layer, and the first surface has a first bonding area thereon. The buffer layer has a second surface facing the substrate, and the second surface has a second bonding area thereon. The first bonding area and the second bonding area are bonded; an area of the first bonding area is smaller than an area of the first surface of the substrate, and an area of the second bonding area is smaller than an area of the second surface of the buffer layer.

In an embodiment, further comprising an adhesive provided by at least one of the first bonding area of the substrate and the second bonding area of the buffer layer, wherein the first bonding area of the substrate and the second bonding area of the buffer layer are bonded through the adhesive.

In an embodiment, the substrate has a folding line, a first end margin and a second end margin, wherein the folding line, the first end margin, and the second end margin all connect the first lateral edge and the second lateral edge. The buffer layer has a third end margin and a fourth end margin, wherein the third end margin and the fourth end margin both connect the third lateral edge and the fourth lateral edge. The substrate and the buffer layer are folded together along the folding line of the substrate, making the substrate form an outer bag and the buffer layer form an inner bag, wherein the inner bag has a containing space formed therein, and the inner bag is provided in the outer bag.

In an embodiment, the substrate has a first surface facing the buffer layer, and the first surface has a first bonding area thereon. The first bonding area is located between the first end margin and the folding line of the substrate. The buffer layer has a second surface facing the substrate, and the second surface has a second bonding area thereon. The first bonding area is adapted to be bonded with the second bonding area. A first accommodating space is formed between a part of the substrate, a part of the buffer layer, the first tightly merged line, the second tightly merged line, and where the first bonding area and the second bonding area are bonded.

In an embodiment, the first surface of the substrate further has a third bonding area thereon. The third bonding area is located between the second end margin and the folding line of the substrate. The second surface of the buffer layer further has a fourth bonding area thereon. The third bonding area is adapted to be bonded with the fourth bonding area. A second accommodating space is formed between another part of the substrate, another part of the buffer layer, the first tightly merged line, the second tightly merged line, and where the third bonding area and the fourth bonding area are bonded. A compartment is formed between yet another part of the substrate, yet another part of the buffer layer, the first tightly merged line, the second tightly merged line, where the first bonding area and the second bonding area are bonded, and where the third bonding area and the fourth bonding area are bonded.

In an embodiment, the first surface of the substrate further has a fifth bonding area, and the second surface of the buffer layer has a sixth bonding area. The fifth bonding area is adapted to be bonded with the sixth bonding area. The compartment comprises a first sub-compartment and a second sub-compartment. The first sub-compartment and the second sub-compartment are separated by where the fifth bonding area and the sixth bonding area are bonded.

In an embodiment, an area of the first bonding area is smaller than an area of the first surface of the substrate, and an area of the second bonding area is smaller than an area of the second surface of the buffer layer.

In an embodiment, the first end margin and the second end margin of the substrate are not aligned, forming a seal flap, which is adapted to seal an opening of the outer bag.

In an embodiment, the substrate further comprises another adhesive and a release liner. The another adhesive is provided on the seal flap, and the release liner is provided on the another adhesive. After removing the release liner, the another adhesive is adapted to seal the opening of the outer bag.

The present invention also provides a method of making a wrapping material, including the following steps: A. provide a substrate; B. stack a buffer layer on the substrate; and C. use a thermal cutting tool to cut the substrate and the buffer layer, making the substrate and the buffer layer form a first tightly merged line and a second tightly merged line at where they are cut, wherein a distance between the first tightly merged line and the second tightly merged line is substantially the same as a width of the substrate and a width of the buffer layer.

In an embodiment, the substrate has a first surface facing the buffer layer, and the buffer layer has a second surface facing the substrate. In Step B, an adhesive is further applied on either one or both of a first bonding area of the first surface and a second bonding area of the second surface, whereby to bond the first bonding area and the second bonding area through the adhesive.

In an embodiment, an area of the first bonding area is smaller than an area of the first surface of the substrate, and an area of the second bonding area is smaller than an area of the second surface of the buffer layer.

In an embodiment, Step C includes the following steps: fold the substrate and the buffer layer, which are stacked together, along a folding line of the substrate; and use the thermal cutting tool to cut the substrate and the buffer layer after they are folded, making the substrate form an outer bag, and the buffer layer form an inner bag. The inner bag has a containing space formed therein, and the inner bag is provided in the outer bag.

In an embodiment, the substrate has a first surface facing the buffer layer, and the buffer layer has a second surface facing the substrate. In Step B, an adhesive is further applied on either one or both of a first bonding area of the first surface and a second bonding area of the second surface, whereby to bond the first bonding area and the second bonding area through the adhesive, wherein the first bonding area is located between the first end margin and the folding line of the substrate, and the second bonding area corresponds to the first bonding area.

In an embodiment, in Step B, another adhesive is further applied on either one or both of a third bonding area of the first surface and a fourth bonding area of the second surface, whereby to bond the third bonding area and the fourth bonding area through the another adhesive, wherein the third bonding area is located between the second end margin and the folding line of the substrate, and the fourth bonding area corresponds to the third bonding area.

In an embodiment, in Step B, yet another adhesive is further applied on either one or both of a fifth bonding area of the first surface and a sixth bonding area of the second surface, whereby to bond the fifth bonding area and the sixth bonding area through the yet another adhesive, wherein the fifth bonding area is located at the folding line of the substrate, and the sixth bonding area corresponds to the fifth bonding area.

In an embodiment, an area of the first bonding area is smaller than an area of the first surface of the substrate, and an area of the second bonding area is smaller than an area of the second surface of the buffer layer.

In an embodiment, a size of the substrate is larger than a size of the buffer layer. Therefore, when the buffer layer is stacked on the substrate, a part of the substrate is not covered by the buffer layer.

The wrapping material provided in the present invention has flat surfaces, and therefore the texts or images printed thereon could be better rendered. Free of interfering indentations, it would be suitable to handwrite on the surfaces. In addition, since the wrapping material has no flattened edges on the lateral sides, the tamper evident bag made of the wrapping material would have a maximum accommodating space inside.

BRIEF DESCRIPTION OF THE DRAWINGS

The present invention will be best understood by referring to the following detailed description of one illustrative embodiment in conjunction with the accompanying drawings, in which.

DETAILED DESCRIPTION

The terms “substantially equal to” or “substantially the same” used in the following embodiments refer to the fact that the dimensions of one component or structure are equal to the dimensions of another component or structure. However, even described with such terms, the dimensions of one component or structure may not be precisely equal to the dimensions of another component or structure due to manufacturing tolerances or other factors. In other words, manufacturing or assembling tolerance should be allowed for the dimensions of one component or structure and the dimensions of another component or structure. For example, but not limited to, manufacturing or assembling tolerance within 5 mm should still be deemed within the scope of protection of the present invention.

Figure 2:
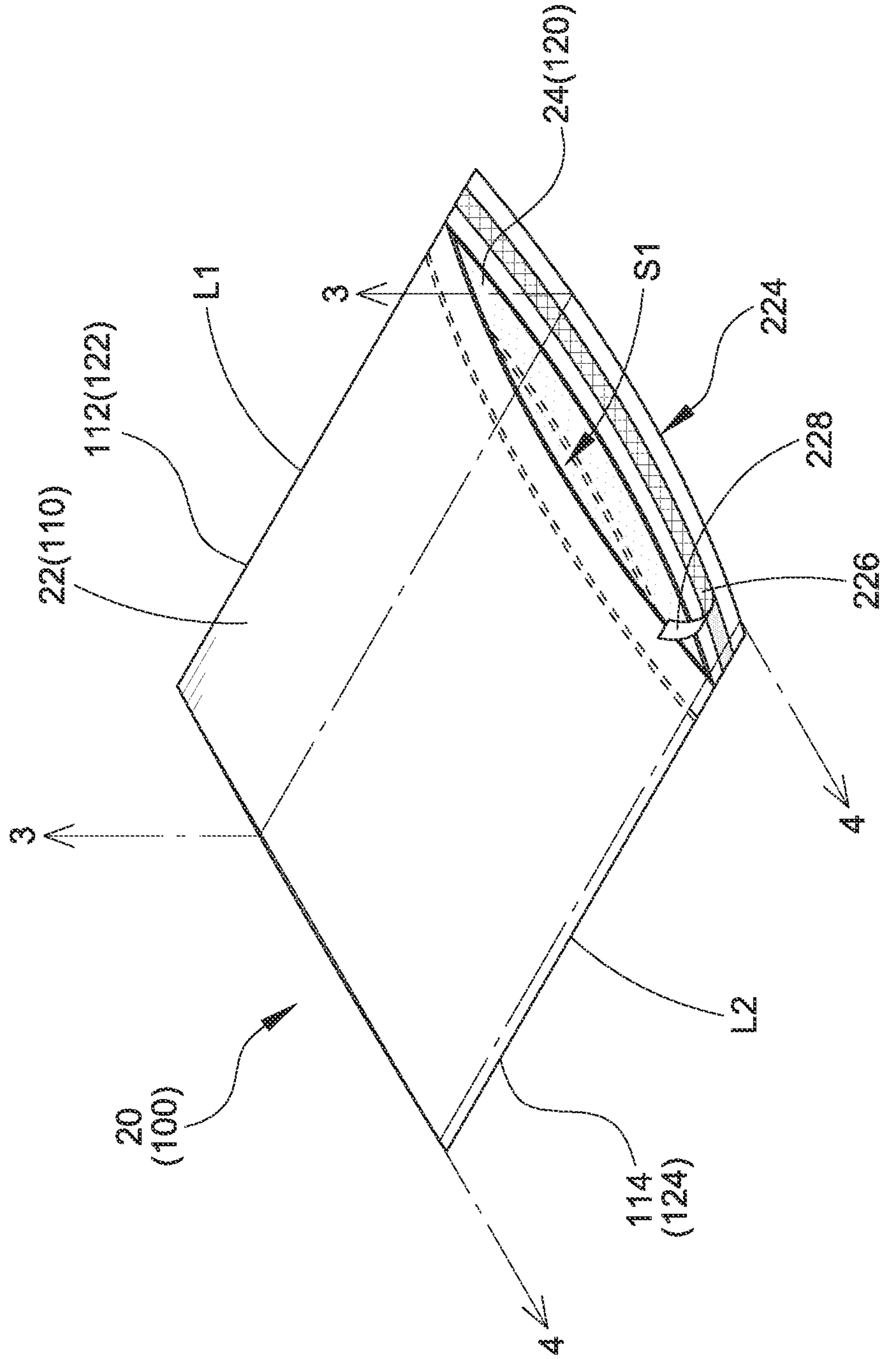
FIG. 2 is a perspective view of a tamper evident bag made of a wrapping material provided in the present invention.
Figure 3:
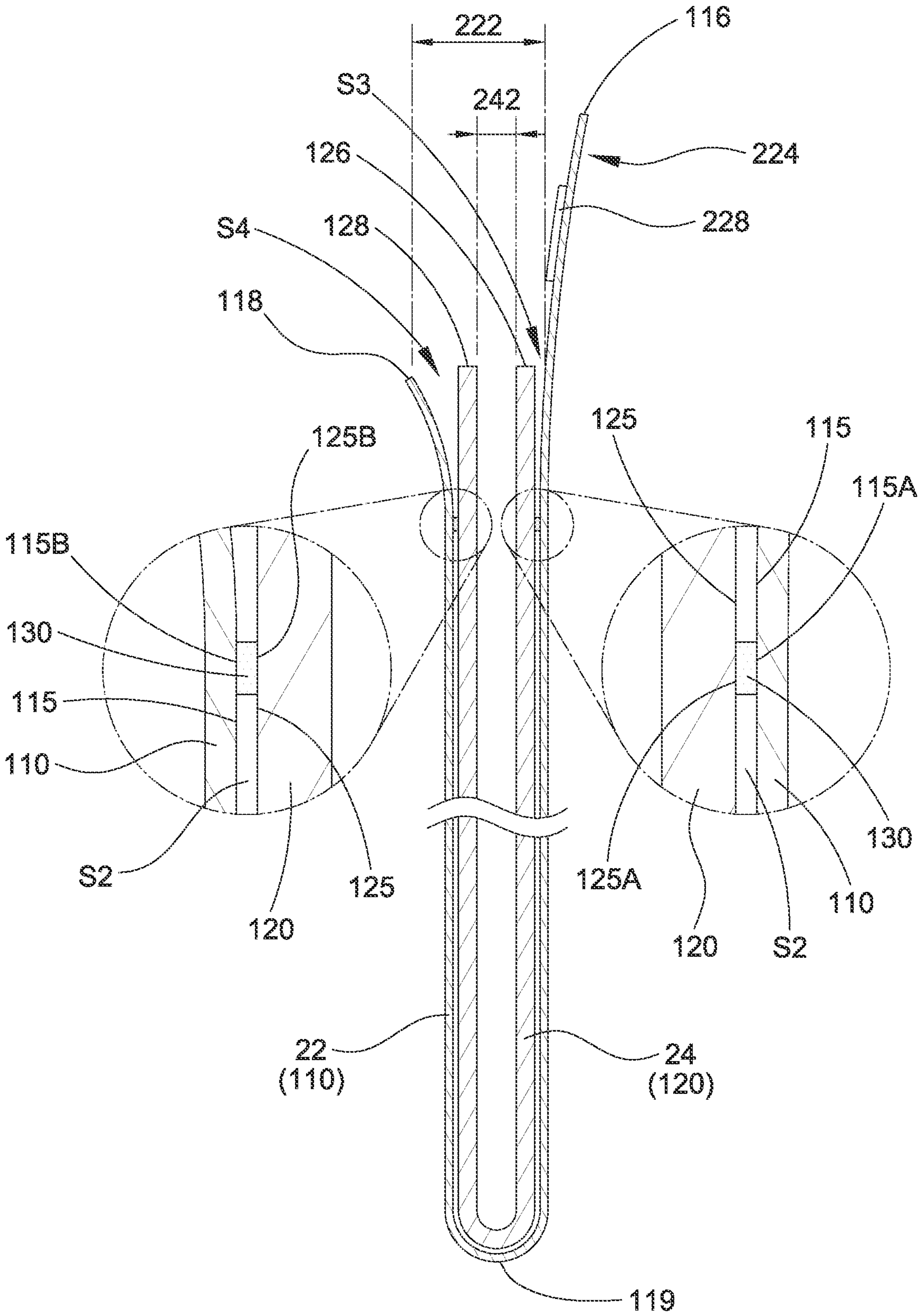
FIG. 3 is a sectional view of the temper evident bag shown along the 3-3 line in FIG. 2.
Figure 4:
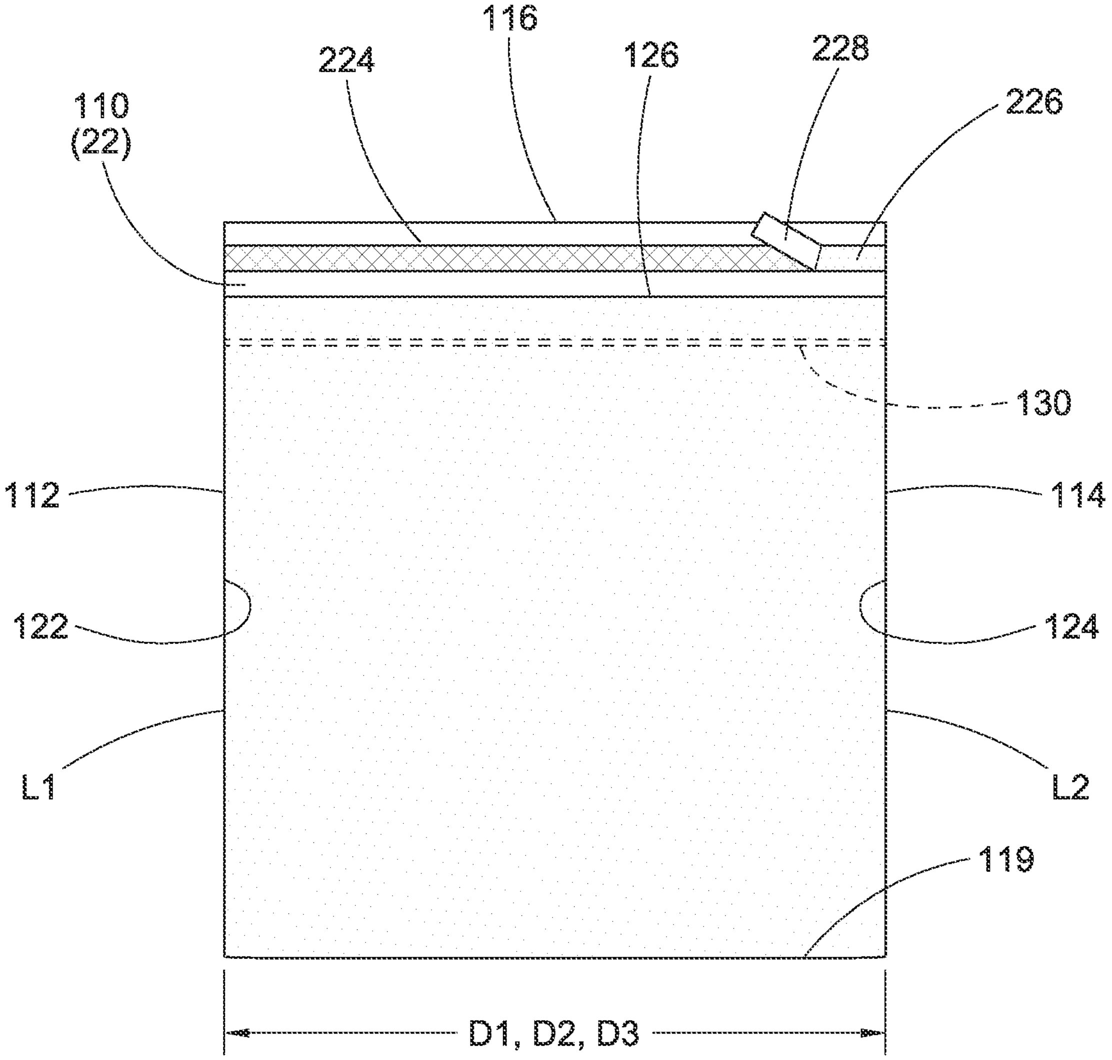
FIG. 4 is a sectional view of the tamper evident bag shown along the 4-4 line in FIG. 2.

Referring to FIGS. 2 to 4, FIG. 2 shows a tamper evident bag 20 made of a wrapping material 100 of an embodiment of the present invention, FIG. 3 is a sectional view seen along the 3-3 line in FIG. 2, and FIG. 4 is another sectional view seen along the 4-4 line in FIG. 2. The tamper evident bag 20 has a double-layered structure, and includes an outer bag 22 and an inner bag 24, wherein the inner bag 24 fits inside the outer bag 22, and the inner bag 24 forms a containing space S1 therein to contain objects. A bag opening of the tamper evident bag 20 could be further distinguished into an opening 222 formed by the outer bag 22 and an opening 242 formed by the inner bag 24. The outer bag 22 has a seal flap 224 provided at the opening 222 thereof, wherein the seal flap 224 extends out of the inner bag 24, and is applied with a first adhesive 226 thereon. A release liner 228 covers the first adhesive 226. By removing the release liner 228 and fold the seal flap 224 inward, the seal flap 224 and a surface of the outer bag 22 on opposite side could be tightly bonded together through the first adhesive 226, sealing the opening 222 of the outer bag 22 and the opening 242 of the inner bag 24 at the same time. In other words, the bag opening of the tamper evident bag 20 is sealed as a result.

The outer bag 22 of the tamper evident bag 20 is formed by a substrate 110 of the wrapping material 100 of the embodiment of the present invention, while the inner bag 24 is formed by a buffer layer 120 of the wrapping material 100. The substrate 110 is made of an opaque material, and the buffer layer 120 is a cushioning material. The substrate 110 has a first lateral edge 112 and a second lateral edge 114. The buffer layer 120 has a third lateral edge 122 and a fourth lateral edge 124. The first lateral edge 112 and the third lateral edge 122 are tightly merged into a first tightly merged line L1, and the second lateral edge 114 and the fourth lateral edge 124 are tightly merged into a second tightly merged line L2. The first lateral edge 112 and the second lateral edge 114 of the substrate 110 are separated by a first distance D1, and the third lateral edge 122 and the fourth lateral edge 124 of the buffer layer 120 are separated by a second distance D2. The first tightly merged line L1 and the second tightly merged line L2 are separated by a third distance D3. The first distance D1, the second distance D2, and the third distance D3 are substantially equal. In other words, the wrapping material 100 (and the tamper evident bag 20 made of the wrapping material 100) does not have flattened banded edges as the flattened banded edges 10A of the above-mentioned conventional tamper evident bag 10. Therefore, the containing space S1 inside the inner bag 24 could provide maximum usable space.

For the ease of explaining the relation between the wrapping material 100 of the embodiment of the present invention and the tamper evident bag 20 made of, herein we define the substrate 110 of the wrapping material 100 has a first end margin 116, a second end margin 118, and a folding line 119, and the buffer layer 120 has a third end margin 126 and a fourth end margin 128. The first end margin 116 and the second end margin 118 both connect the first lateral edge 112 and the second lateral edge 114 of the substrate 110. Similarly, the third end margin 126 and the fourth end margin 128 both connect the third lateral edge 122 and the fourth lateral edge 124 of the buffer layer 120. The substrate 110 and the buffer layer 120 are folded together along the folding line 119. In this way, the substrate 110 constitutes the outer bag 22, and the buffer layer 120 constitutes the inner bag 24. The third end margin 126 and the fourth end margin 128 form the aforementioned opening 242 of the inner bag 24. In addition, the first end margin 116 and the second end margin 118 of the substrate 110 are not aligned, whereby to form the seal flap 224. The seal flap 224 could be flipped relative to the substrate 110 along a reverse folding line of the substrate 110. The reverse folding line of the substrate 110 and the second end margin 118 form the aforementioned opening 222 of the outer bag 22.

As described above, the substrate 110 and the buffer layer 120 of the wrapping material 100 of the embodiment of the present invention are combined through the first tightly merged line L1 and the second tightly merged line L2 which are formed by merging edges tightly. In addition, the substrate 110 and the buffer layer 120 are also applied with a second adhesive 130 therebetween, which could further help the substrate 110 and the buffer layer 120 bond together. Specifically, a surface of the substrate 110 facing the buffer layer 120 is defined as a first surface 115, and a surface of the buffer layer 120 facing the substrate 110 is defined as a second surface 125, wherein the first surface 115 has a first bonding area 115A thereon, and the second surface 125 has a second bonding area 125A thereon. The second adhesive 130 is provided on either one or both of the first bonding area 115A and the second bonding area 125A, whereby the first bonding area 115A and the second bonding area 125A are bonded through the second adhesive 130. As a result, the substrate 110 and the buffer layer 120 are bonded together. The first bonding area 115A is located between the first end margin 116 and the folding line 119 of the substrate 110, while the second bonding area 125A is located at a position on the buffer layer 120 corresponding to the first bonding area 115A. With such design, the substrate 110 and the buffer layer 120 have a first accommodating space S3 in between, wherein the first accommodating space S3 is formed by a part of the substrate 110, a part of the buffer layer 120, the first tightly merged line L1, the second tightly merged line L2, and where the first bonding area 115A and the second bonding area 125A are bonded. It would be convenient to place a thin object, such as a paper sheet, into the first accommodating space S3, and it could be easily removed if necessary.

Furthermore, an area of the first bonding area 115A is less than an area of the first surface 115 of the substrate 110, and an area of the second bonding area 125A is also smaller than an area of the second surface 125 of the buffer layer 120. Therefore, when the wrapping material 100 of the embodiment of the present invention is made into the tamper evident bag 20, the inner bag 24 and the outer bag 22 are not completely bonded together.

In addition, as shown in FIG. 3, after the wrapping material 100 of the embodiment of the present invention is made into the tamper evident bag 20, there could be a third bonding area 115B correspondingly provided on the first surface 115, and a fourth bonding area 125B provided on the second surface 125, wherein the third bonding area 115B and the fourth bonding area 125B are on a side of the tamper evident bag 20 which the seal flap 224 is not on. Specifically, the third bonding area 115B is located between the second end margin 118 and the folding line 119 of the substrate 110, and the fourth bonding area 125B is located at a position corresponding to the third bonding area 115B. Furthermore, the second adhesive 130 is also applied on either one or both of the third bonding area 115B and the fourth bonding area 125B, whereby to also bond the third bonding area 115B and the fourth bonding area 125B together through the second adhesive 130. With such design, the outer bag 22 and the inner bag 24 of the of the tamper evident bag 20 further has a second accommodating space S4 formed therebetween, wherein the second accommodating space S4 is formed by another part of the substrate 110, another part of the buffer layer 120, the first tightly merged line L1, the second tightly merged line L2, and where the third bonding area 115B and the fourth bonding area 125B are bonded. Moreover, a compartment S2 is formed by yet another part of the substrate 110, yet another part of the buffer layer 120, the first tightly merged line L1, the second tightly merged line L2, where the first bonding area 115A and the second bonding area 125A are bonded, and where the third bonding area 115B and the fourth bonding area 125B are bonded.

The compartment S2 could be used to contain an identifying item (not shown), such as a name card, a flyer, a QR code, etc. Understandably, in such a usage scenario, the substrate 110 is, of course, not made of an opaque material, or the identifying item could not be seen or scanned. However, if the substrate 110 is made of an opaque material as described in the current embodiment, then the identifying item could be, but not limited to, a radio frequency identification (RFID) tag. In this way, even if the identifying information is shielded by the substrate 110, it could be still read by a sensor. Since the compartment S2 mentioned above is enclosed by the first tightly merged line L1, the second tightly merged line L2, the bonded first and second bonding areas 115A, 125A, and the bonded third and fourth bonding areas 115B, 125B, the aforementioned identifying item which is placed in the compartment S2 would not accidentally fall off in any case.

Figure 5:
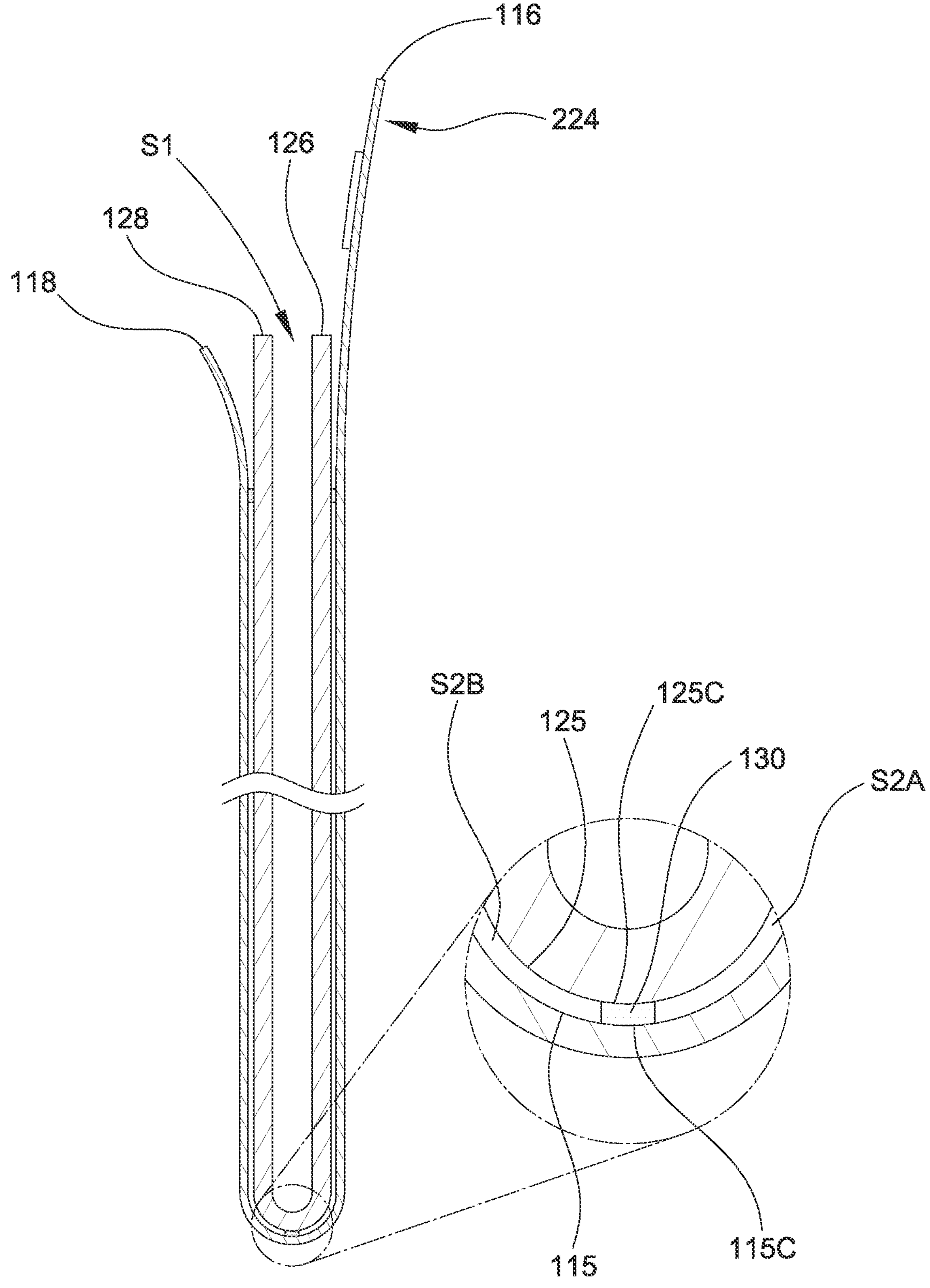
FIG. 5 is a sectional view similar to FIG. 3, showing another implementation of the tamper evident bag.

Another embodiment of the present invention is shown in FIG. 5, which has roughly the same design with the previous embodiment, except that the first surface 115 of the substrate 110 is further provided with a fifth bonding area 115C, and the second surface 125 of the buffer layer 120 is correspondingly provided with a sixth bonding area 125C. The second adhesive 130 is also applied on either one or both of the fifth bonding area 115C and the sixth bonding area 125C, whereby the fifth bonding area 115C and the sixth bonding area 125C are also bonded through the second adhesive 130. In the current embodiment, the fifth bonding area 115C is provided at a position corresponding to the folding line 119. However, this is not a limitation of the present invention. To meet actual requirements, the fifth bonding area 115C could be provided at another position on the first surface 115 other than the folding line 119 instead. The compartment S2 is separated by the bonded fifth and sixth bonding areas 115C, 125C into a first sub-compartment S2A and a second sub-compartment S2B. Therefore, the first sub-compartment S2A and the second sub-compartment S2B could be respectively used to accommodate different identifying items, providing more flexible applications for the tamper evident bag 20.

Figure 6:
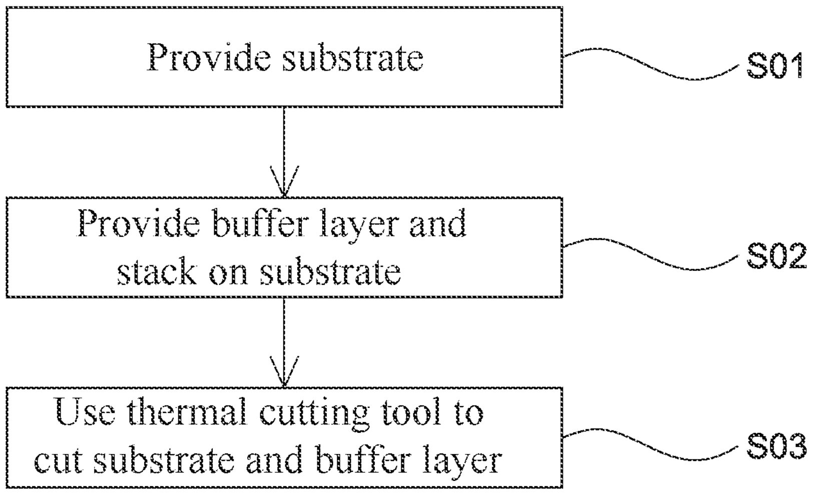
FIG. 6 is a flow chart, showing the method of making the wrapping material of the present invention.
Figure 7:
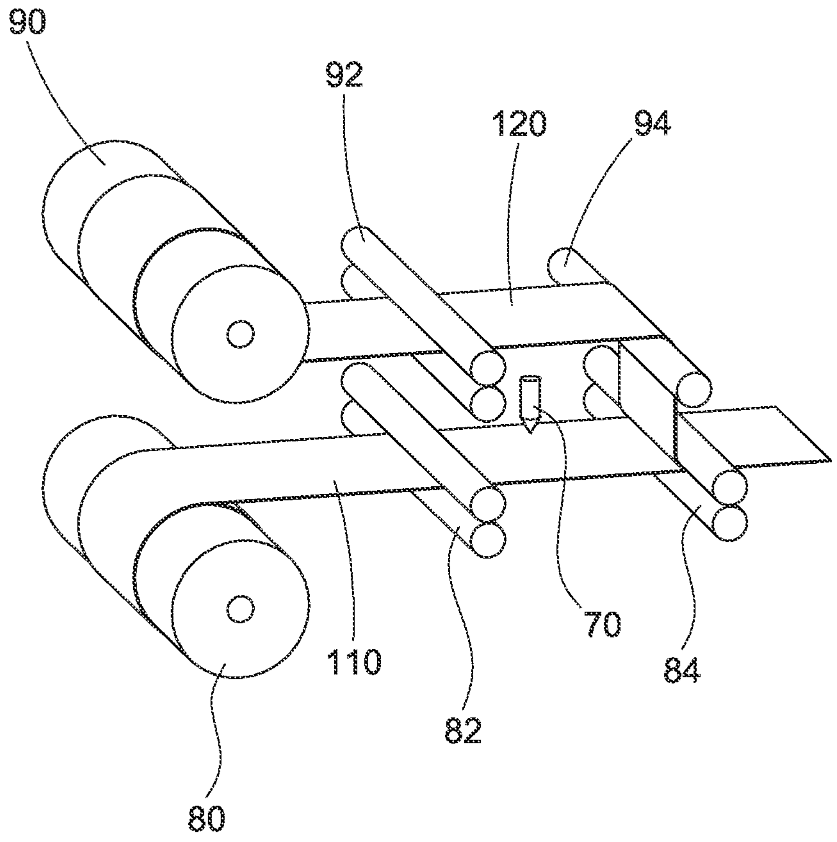
FIG. 7 is a schematic view showing how the substrate and the buffer layer of the wrapping material of the present invention are stacked according to the method mentioned above.

The present invention also provides an embodiment of a method of making the aforementioned wrapping material 100, of which the steps could be seen in FIG. 6. In addition, regarding the method, FIG. 7 to FIG. 10 should be referred to as well. First in step S01, the substrate 110 of a large area is provided, wherein the substrate 110 is pulled out from a substrate roll 80, and passes through an organizing roller assembly 82 to keep it flat and even. After that, in step S02, the buffer layer 120 of a large area is stacked on the substrate 110, wherein the buffer layer is pulled out from a buffer layer roll 90, and, similarly, passes through an organizing roller assembly 92 to keep it flat and even. The buffer layer 120 which passes through the organizing roller assembly 92 changes its moving direction at a direction-changing roller 94, and then passes through a stacking roller assembly 84 along with the substrate 110, whereby to make the substrate 110 and the buffer layer 120 stack together.

It is worth mentioning that the second adhesive 130 is applied between the substrate 110 and the buffer layer 120 for bonding, wherein the second adhesive 130 is provided by a dispensing tip 70. The second adhesive 130 is applied on the substrate 110 or the buffer layer 120 before they go into the stacking roller assembly 84. As described above, in the method of the current embodiment, the first surface 115 of the substrate 110 faces the buffer layer 120, and the second surface 125 of the buffer layer 120 faces the substrate 110. The second adhesive 130 is applied on either one or both of the first bonding area 115A of the first surface 115 and the second bonding area 125A of the second surface 125. In the current embodiment, where the substrate 110 is applied with the second adhesive 130 by the dispensing tip 70 is the first bonding area 115A. An area of the first bonding area 115A is less than an area of the first surface 115 of the substrate 110, and an area of the second bonding area 125A is smaller than an area of the second surface 125 of the buffer layer 120. Therefore, the substrate 110 and the buffer layer 120 are not completely bonded, and the aforementioned compartment S2 could be formed therebetween.

Figure 8:
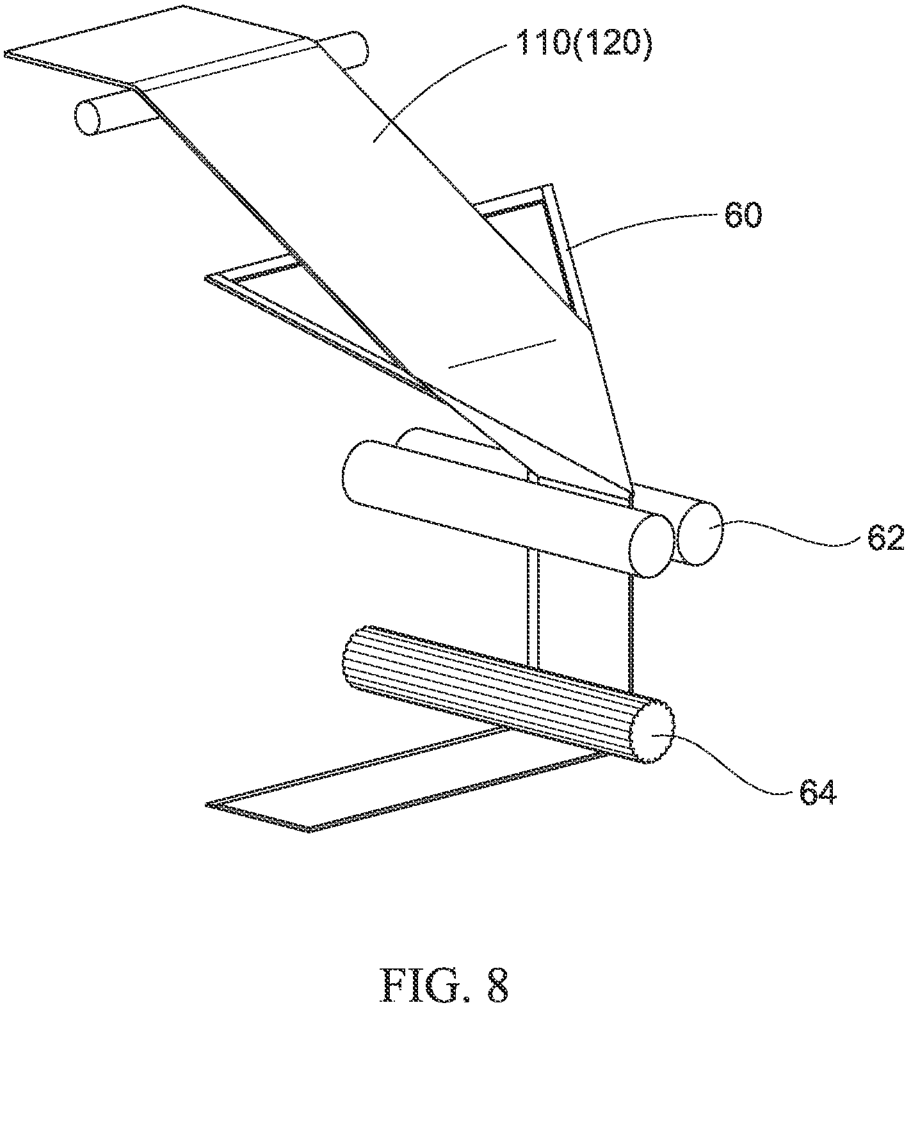
FIG. 8 is a schematic view showing how to fold the substrate and the buffer layer of the wrapping material of the present invention.

Preferably, the substrate 110 is made of an opaque material, and the buffer layer 120 is a cushioning material. Furthermore, a size of the substrate 110 is greater than a size of the buffer layer 120. Therefore, a part of the substrate 110 is not covered by the buffer layer 120, as shown in FIG. 8. In the subsequent processes, the part of the substrate 110 which is not covered by the buffer layer 120 could be applied with the first adhesive 226, and the release liner 228 could be further provided on the first adhesive 226.

And then, in step S03, a thermal cutting tool is used to cut the stacked substrate 110 and the buffer layer 120, wherein the substrate 110 and the buffer layer 120 are tightly merged into a line at where they take the thermal cutting due to being melted by high heat. It is worth mentioning that, in order to make the wrapping material 100 into the tamper evident bag 20, step S03 further includes folding the stacked substrate 110 and buffer layer 120 along the folding line 119. As shown in FIG. 8, the stacked substrate 110 and buffer layer 120 will be naturally folded after passing through a triangular folding member 60. Another organizing roller assembly 62 could be further used to keep the folded substrate 110 and buffer layer 120 flat and even. With the effect of a pressing roller 64, the folded substrate 110 and buffer layer 120 could be bonded more tightly.

Figure 9:
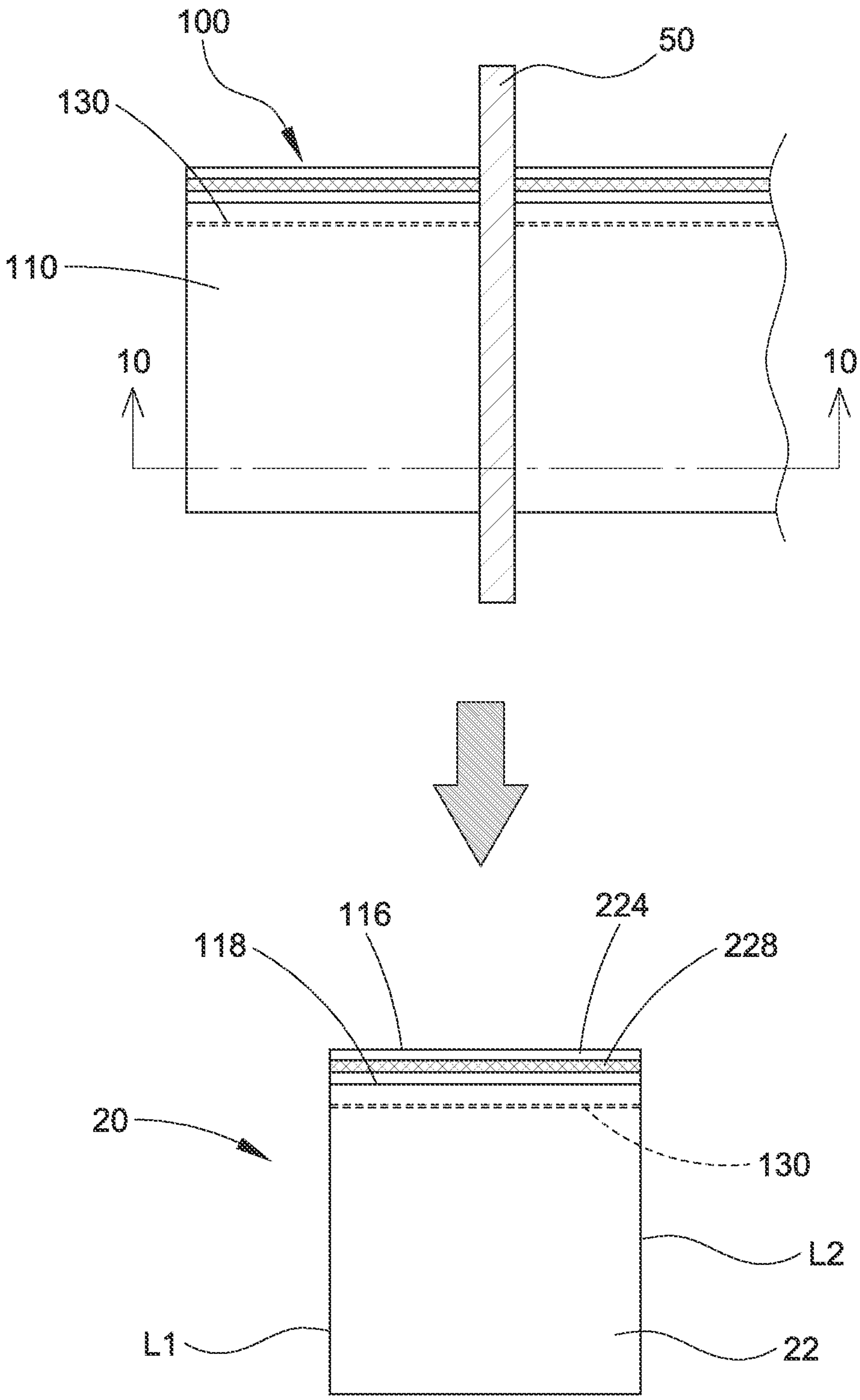
FIG. 9 is a schematic view showing that the substrate and the buffer layer are thermally cut after being fold, whereby to form a product of tamper evident bag.
Figure 10:
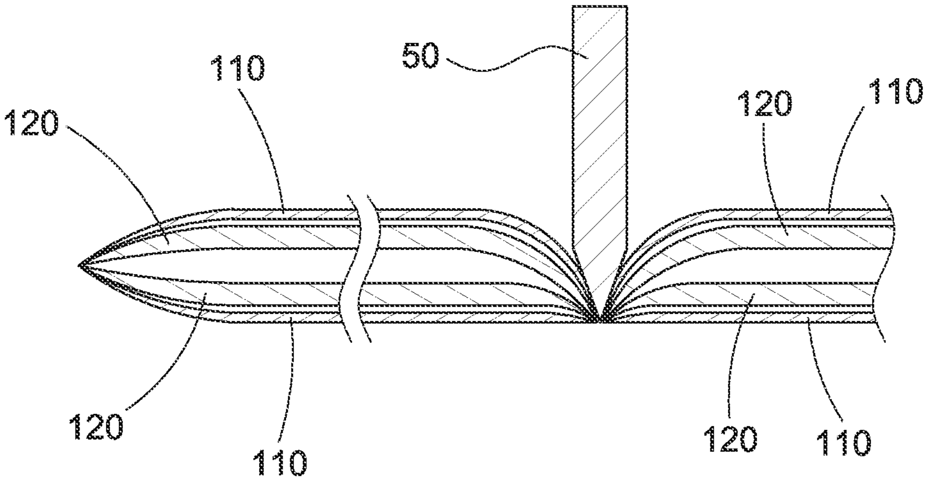
FIG. 10 is a sectional view shown along the 10-10 line in FIG. 9, showing that the substrate and the buffer layer are thermally cut.

As shown in FIG. 9 and FIG. 10, the thermal cutting tool is a thermal cutter 50 in the current embodiment. In the method described herein, the thermal cutter 50 is used to cut the folded substrate 110 and buffer layer 120. When such operation performs twice, the aforementioned first and second tightly merged lines L1, L2 contained in the tamper evident bag 20 would be respectively formed. Therefore, a distance between the first tightly merged line L1 and the second tightly merged line L2 is substantially equal to a first width W1 of the trimmed substrate 110 and a second width W2 of the trimmed buffer layer 120. In other words, the lateral sides of the substrate 110 and the buffer layer 120 are tightly sealed by the first tightly merged line L1 and the second tightly merged line L2, and do not have the flattened banded edges 10A seen in the conventional wrapping material 10.

Figure 1:
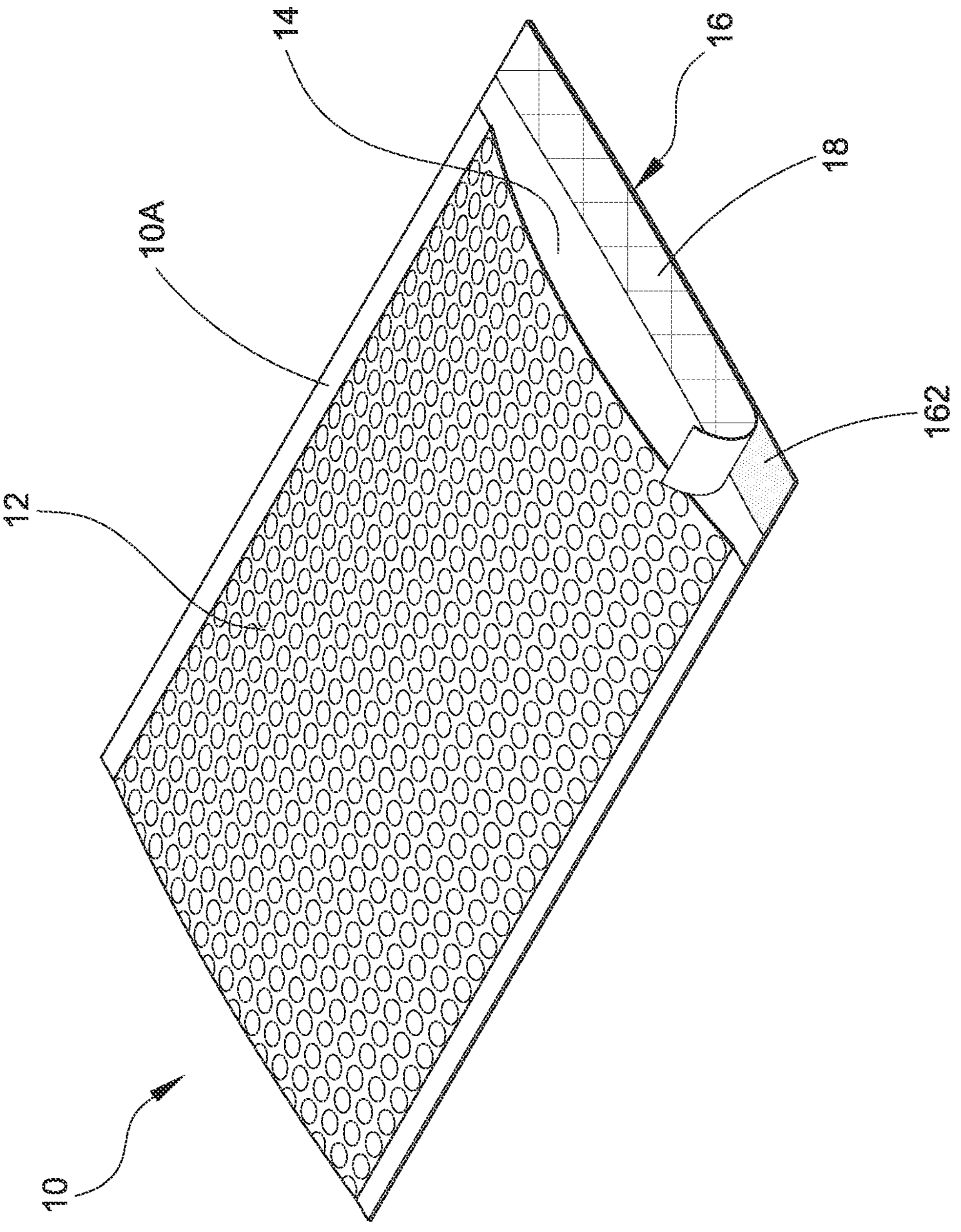
FIG. 1 Prior Art
FIG. 1 is a perspective view of a tamper evident bag made of a conventional wrapping material.

In summary, the structure of the first and second tightly merged lines L1, L2 of the tamper evident bag 20 made by using the thermal cutter 50 would provide a specific feature, which is, the distance between the first tightly merged line L1 and the second tightly merged line L2 is substantially the same as the first width W1 of the substrate 110 and the second width W2 of the buffer layer 120. As a result, the first tightly merged line L1 and the second tightly merged line L2 of the tamper evident bag 20 of the present invention are not flattened banded edges made by thermal pressing, like the flattened banded edges 10A of the conventional wrapping material 10 shown in FIG. 1. Instead, they are tightly merged cutting lines formed by the thermal cutter 50. Take two tamper evident bags of the same size, the one made of the wrapping material 100 provided in the present invention would have linear structures to seal the lateral sides of the substrate 110 and the buffer layer 120, and therefore would have a larger inner space than the one made of a conventional wrapping material.

It is noted that the location of the aforementioned first bonding area 115A, which is applied with the second adhesive 130, could be properly designed in advance so that, after the substrate 110 and the buffer layer 120 are folded, the first bonding area 115A would be just located between the first end margin 116 and the folding line 119 of the substrate 110. The second bonding area 125A correspond to the first bonding area 115A. Whereby, the inner bag 24 and the outer bag 22 of the tamper evident bag 20 could have the first accommodating space S3 formed therebetween.

Moreover, as described above, the second adhesive 130 could be further applied on either one or both of the third bonding area 115B on the first surface 115 of the substrate 110 and the fourth bonding area 125B on the second surface 125 of the buffer layer 120, bonding the third bonding area 115B and the fourth bonding area 125B. The third bonding area 115B is located between the second end margin 118 and the folding line 119 of the substrate 110, and the fourth bonding area 125B corresponds to the third bonding area 115B. In this way, the inner bag 24 and the outer bag 22 of the tamper evident bag 20 could have the second accommodating space S4 formed therebetween.

In addition, based on the other embodiment of the present invention, the method could also apply the second adhesive 130 on either one or both of the fifth bonding area 115C of the first surface 115 and the sixth bonding area 125C of the second surface 125, bonding the fifth bonding area 115C and the sixth bonding area 125C with the second adhesive 130. The fifth bonding area 115C is located at the folding line 119 of the substrate 110, and the sixth bonding area 125C corresponds to the fifth bonding area 115C. As a result, the compartment S2 would be separated into the first sub-compartment S2A and the second sub-compartment S2B.

At this time, the tamper evident bag 20 would be made after the thermal cutting tool described in step S03 is operated, wherein the substrate 110 constitutes the outer bag 22, and the first end margin 116 and the second end margin 118 of the substrate 110 form the opening 222 of the outer bag 22. On the other hand, the buffer layer 120 constitutes the inner bag 24, and the third end margin 126 and the fourth end margin 128 of the buffer layer 120 form the opening 242 of the inner bag 24. In this way, the interior of the inner bag 24 forms the containing space S1, and the part of the substrate 110 not covered by the buffer layer 120 forms the seal flap 224.

The wrapping material 100 made according to the method described above does not go through thermal pressing, and therefore would have indentation-free flat surfaces suitable for printing or handwriting. In addition, the lateral sides of the wrapping material 100 would not have flattened banded edges, whereby the containing space S1 in the tamper evident bag 20 made of the wrapping material 100 could provide maximum usable space.

It should be realized that the above description is only some preferred embodiments of the present invention and should not be deemed as limitations of implementing the present invention. All substantially equivalent variations and modifications which employ the concepts disclosed in this specification and the appended claims should fall within the scope of the present invention.

What is claimed is:

1. A wrapping material, comprising:
a substrate having a first lateral edge and a second lateral edge; and
a buffer layer stacked upon the substrate, wherein the buffer layer has a third lateral edge and a fourth lateral edge;
wherein, the first lateral edge of the substrate and the third lateral edge of the buffer layer are tightly merged into a first tightly merged line, while the second lateral edge of the substrate and the fourth lateral edge of the buffer layer are tightly merged into a second tightly merged line; such that an accommodating space of the wrapping material is formed between the first tightly merged line and the second tightly merged line;
wherein the first tightly merged line and the second tightly merged line form corresponding terminal linear edges devoid of a flattened banded edge;
wherein a first distance between the first lateral edge and the second lateral edge of the substrate, a second distance between the third lateral edge and the fourth lateral edge of the buffer layer, and a third distance between the first tightly merged line and the second tightly merged line are all substantially the same.

2. A wrapping material, comprising:
a substrate having a first lateral edge and a second lateral edge; and
a buffer layer stacked upon the substrate, wherein the buffer layer has a third lateral edge and a fourth lateral edge; wherein, the first lateral edge of the substrate and the third lateral edge of the buffer layer are tightly merged into a first tightly merged line, while the second lateral edge of the substrate and the fourth lateral edge of the buffer layer are tightly merged into a second tightly merged line;
wherein the first tightly merged line and the second tightly merged line form corresponding terminal linear edges devoid of a flattened banded edge;
an identifying item disposed between the substrate and the buffer layer.

3. The wrapping material of claim 1, wherein the substrate has a first surface facing the buffer layer, and the first surface has a first bonding area thereon; the buffer layer has a second surface facing the substrate, and the second surface has a second bonding area thereon; the first bonding area and the second bonding area are bonded; an area of the first bonding area is smaller than an area of the first surface of the substrate, and an area of the second bonding area is smaller than an area of the second surface of the buffer layer.

4. The wrapping material of claim 3, further comprising an adhesive provided at at least one of the first bonding area of the substrate and the second bonding area of the buffer layer, wherein the first bonding area of the substrate and the second bonding area of the buffer layer are bonded through the adhesive.

5. The wrapping material of claim 1, wherein the substrate has a folding line, a first end margin and a second end margin; the folding line, the first end margin, and the second end margin all connect the first lateral edge and the second lateral edge;

the buffer layer has a third end margin and a fourth end margin, wherein the third end margin and the fourth end margin both connect the third lateral edge and the fourth lateral edge;

the substrate and the buffer layer are folded together along the folding line of the substrate, making the substrate form an outer bag and the buffer layer form an inner bag, wherein the inner bag has a containing space formed therein, and the inner bag is provided in the outer bag.

6. The wrapping material of claim 5, wherein the substrate has a first surface facing the buffer layer, and the first surface has a first bonding area thereon; the first bonding area is located between the first end margin and the folding line of the substrate;

the buffer layer has a second surface facing the substrate, and the second surface has a second bonding area thereon; the first bonding area is adapted to be bonded with the second bonding area;

a first accommodating space is formed between a part of the substrate, a part of the buffer layer, the first tightly merged line, the second tightly merged line, and where the first bonding area and the second bonding area are bonded.

7. The wrapping material of claim 6, wherein the first surface of the substrate further has a third bonding area thereon; the third bonding area is located between the second end margin and the folding line of the substrate;

the second surface of the buffer layer further has a fourth bonding area thereon; the third bonding area is adapted to be bonded with the fourth bonding area;

a second accommodating space is formed between another part of the substrate, another part of the buffer layer, the first tightly merged line, the second tightly merged line, and where the third bonding area and the fourth bonding area are bonded;

a compartment is formed between yet another part of the substrate, yet another part of the buffer layer, the first tightly merged line, the second tightly merged line, where the first bonding area and the second bonding area are bonded, and where the third bonding area and the fourth bonding area are bonded.

8. The wrapping material of claim 7, wherein the first surface of the substrate further has a fifth bonding area, and the second surface of the buffer layer has a sixth bonding area; the fifth bonding area is adapted to be bonded with the sixth bonding area; the compartment comprises a first sub-compartment and a second sub-compartment; the first sub-compartment and the second sub-compartment are separated by where the fifth bonding area and the sixth bonding area are bonded.

9. The wrapping material of claim 6, wherein an area of the first bonding area is smaller than an area of the first surface of the substrate, and an area of the second bonding area is smaller than an area of the second surface of the buffer layer.

10. The wrapping material of claim 5, wherein the first end margin and the second end margin of the substrate are not aligned, forming a seal flap, which is adapted to seal an opening of the outer bag.

11. The wrapping material of claim 10, wherein the substrate further comprises another adhesive and a release liner; the another adhesive is provided on the seal flap, and the release liner is provided on the another adhesive; after removing the release liner, the another adhesive is adapted to seal the opening of the outer bag.

* * * * *